US010513845B1

(12) United States Patent
Scott

(10) Patent No.: US 10,513,845 B1
(45) Date of Patent: Dec. 24, 2019

(54) ADJUSTABLE GARAGE DOOR PEST BARRIER

(71) Applicant: Thomas Scott, Lake Lure, NC (US)

(72) Inventor: Thomas Scott, Lake Lure, NC (US)

( * ) Notice: Subject to any disclaimer, the term of this patent is extended or adjusted under 35 U.S.C. 154(b) by 0 days.

(21) Appl. No.: 16/153,137

(22) Filed: Oct. 5, 2018

(51) Int. Cl.

| | |
|---|---|
| ***A01K 3/00*** | (2006.01) |
| ***E04B 1/72*** | (2006.01) |
| *E06B 1/68* | (2006.01) |
| *E06B 7/23* | (2006.01) |
| *E06B 1/62* | (2006.01) |
| *E04F 19/02* | (2006.01) |

(52) U.S. Cl.
CPC .............. *E04B 1/72* (2013.01); *E04F 19/028* (2013.01); *E06B 1/68* (2013.01); *E06B 7/2316* (2013.01); *E06B 2001/622* (2013.01)

(58) Field of Classification Search
None
See application file for complete search history.

(56) References Cited

U.S. PATENT DOCUMENTS 1,287,673 A * 12/1918 Gogay ...................... E06B 1/34 52/211
1,913,716 A * 6/1933 Meilink .................... E06B 1/20 109/77
2,840,201 A * 6/1958 Anderson ................ E06B 1/18 52/217
3,226,781 A * 1/1966 Schnabel .............. E06B 1/6015 403/2
3,407,553 A * 10/1968 Halpern ................ B66B 13/306 49/505
3,740,907 A * 6/1973 Loomis ................. B66B 13/306 52/205
3,984,952 A * 10/1976 Loomis ................. B66B 13/303 52/127.1
4,815,250 A 3/1989 Mulford
5,465,532 A 11/1995 Varin
5,479,754 A * 1/1996 Pelvilain ............... B66B 13/303 187/408
5,904,014 A * 5/1999 Ripamonti ............ B66B 13/303 52/217
6,293,061 B1 * 9/2001 Horak, Jr. ............ E06B 1/6015 52/213
6,837,000 B2 1/2005 Renzi
(Continued)

*Primary Examiner* — Basil S Katcheves
(74) *Attorney, Agent, or Firm* — Goldstein Law Offices, P.C.

(57) ABSTRACT

An adjustable barrier for use with a building having a door frame with a door frame opening, a track assembly, and a garage door positioned between the track assembly to selectively cover the door frame opening, the adjustable barrier comprising a barrier bracket and an extendable barrier panel. The adjustable barrier is adapted to seal off a garage door gap located between the garage door and the door frame, and is positioned between the door frame and the track to create a barrier preventing a pest from bypassing the garage door and entering the building through the garage door gap. The extendable barrier panel selectively extends and retracts to adjust to the distance between the track and the door frame, and may further be tapered to allow the adjustable barrier to maintain contact with the track when the track curves away from the door frame.

3 Claims, 9 Drawing Sheets

(56) References Cited

U.S. PATENT DOCUMENTS

| | | | | |
|---|---|---|---|---|
| 6,938,380 | B2 * | 9/2005 | Friedman | B66B 13/301 49/505 |
| 7,921,603 | B2 * | 4/2011 | Darnell | E06B 1/32 49/504 |
| 9,441,411 | B2 | 9/2016 | Davis | |
| 2012/0047811 | A1 | 3/2012 | Weeks | |
| 2013/0014453 | A1 | 1/2013 | Hargrave et al. | |
| 2015/0292197 | A1 | 10/2015 | Miller et al. | |

* cited by examiner

ADJUSTABLE GARAGE DOOR PEST BARRIER

TECHNICAL FIELD

The present disclosure relates generally to a pest barrier. More particularly, the present disclosure relates to an adjustable barrier for use with a garage door, adapted to prevent a pest from bypassing the garage door through a gap between the garage door and a garage door frame.

BACKGROUND

Many buildings are equipped with vertically sliding doors which open and close using a track assembly, such as garage doors and loading dock doors. Such doors are subject to buckling or warping which causes the door to separate from the frame. As a garage door is usually the single largest opening to the building, and any variance between the door and the door frame is proportionally magnified, producing a gap large enough to allow pests such as rodents, snakes, and large insects to bypass the door and gain entry into the building through such gaps. The presence of pests within the building is not only unpleasant, but can lead to significant structural damage to the building as well as cause the spread of disease when the pests are vectors for the spread of pathogens.

To prevent pests from passing through gaps between the door and the door frame, many garage doors have weather stripping installed on the exterior of the door to cover any gaps which appear between the door and the door frame. Other solutions exist in the prior art which also serve to externally seal off contact between the door frame and the door, or seek to reinforce the exterior of the door frame or the door. However, none of these solutions address the problem of warping. For example, if the door warps or buckles inwardly, this may produce a gap between the door and the weather stripping through which pests may enter. Further, externally mounted reinforcing means have the side effect of spoiling the visual integrity of the original door and frame.

A need therefore exists for an adjustable barrier which prevents the entry of pests into the building through the garage door, while overcoming the deficiencies of the prior art.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a barrier adapted to prevent a pest from entering a building through a garage door gap between a garage door and a garage door frame. Accordingly, the present disclosure provides an adjustable barrier adapted for use with a garage door and track assembly to seal off the garage door gap between the garage door and the garage door frame. The adjustable barrier comprises a barrier bracket having an anchoring plate, a barrier plate positioned perpendicular to the anchoring plate, and an extendable barrier plate attached to the barrier plate. The adjustable barrier is positioned between the track assembly and the garage door frame, to seal off the garage door gap from the garage door frame to the track assembly to prevent a pest from passing therethrough.

Another aspect of an example embodiment in the present disclosure is to provide a barrier which is adjustable to account for varying distances between the track assembly and the garage door frame. Accordingly, the present disclosure provides an adjustable barrier whereby the extendable barrier panel is adapted to extend and retract between an extended and a retracted position, whereby the extendable barrier panel is extended to ensure that the adjustable barrier spans the entire distance between the garage door frame and the track assembly.

It is yet another aspect of an example embodiment in the present disclosure to provide a barrier which is capable of being placed on either side of the garage door to seal off any garage door gap between the garage door and the garage door frame. Accordingly, the present disclosure provides an adjustable barrier which is reversible and can be placed on either side of the garage door without requiring modification.

It is yet another aspect of the present disclosure to provide a barrier which is capable of adapting to a curved track assembly which angles away from the door frame as the track extends upward from the ground. Accordingly, the present disclosure provides an adjustable barrier whereby the extendable barrier panel has a tapered configuration where the width of the extendable barrier panel increases from the lower edge towards the top edge, allowing the adjustable barrier to maintain contact with the track as it extends upwardly from the ground at an angle which progressively increases the distance between the track and the garage door frame.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1A:
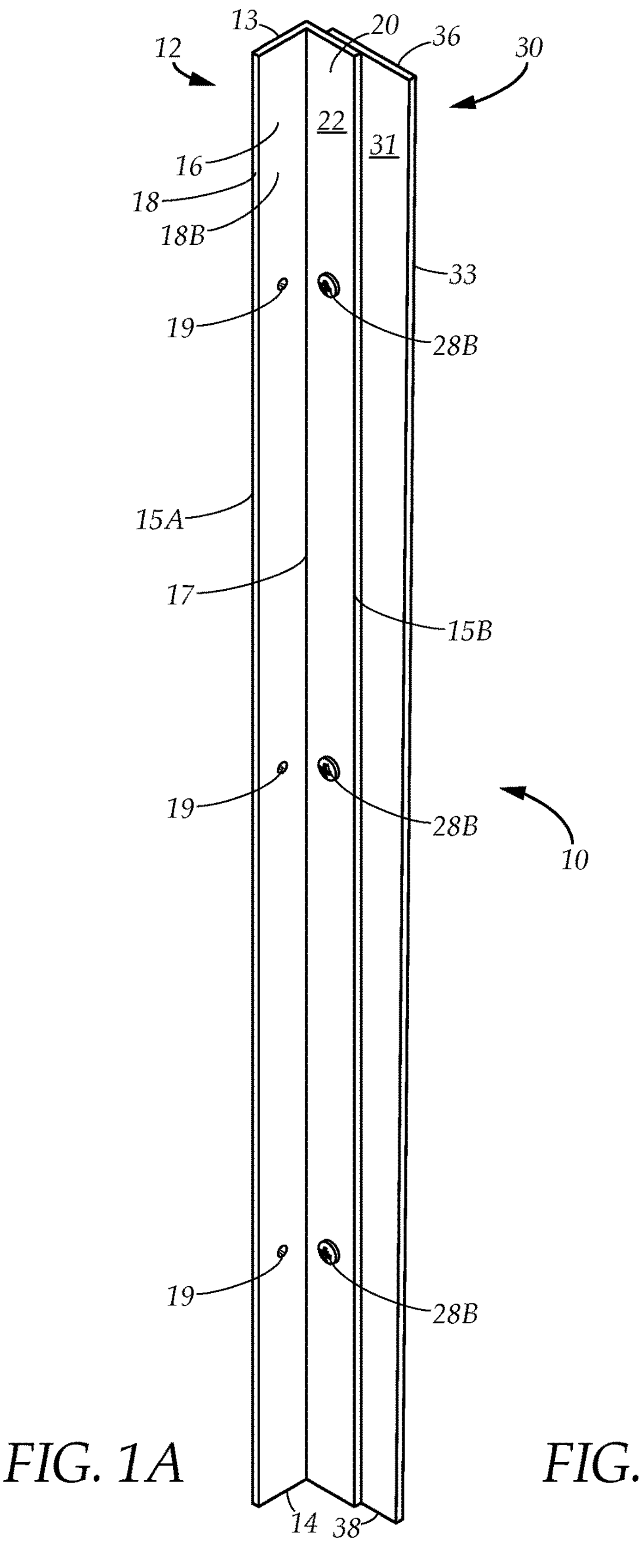
FIG. 1A is a diagrammatical perspective view showing an adjustable barrier comprising a barrier bracket and an extendable barrier panel, in accordance with an embodiment of the present disclosure.
Figure 1B:
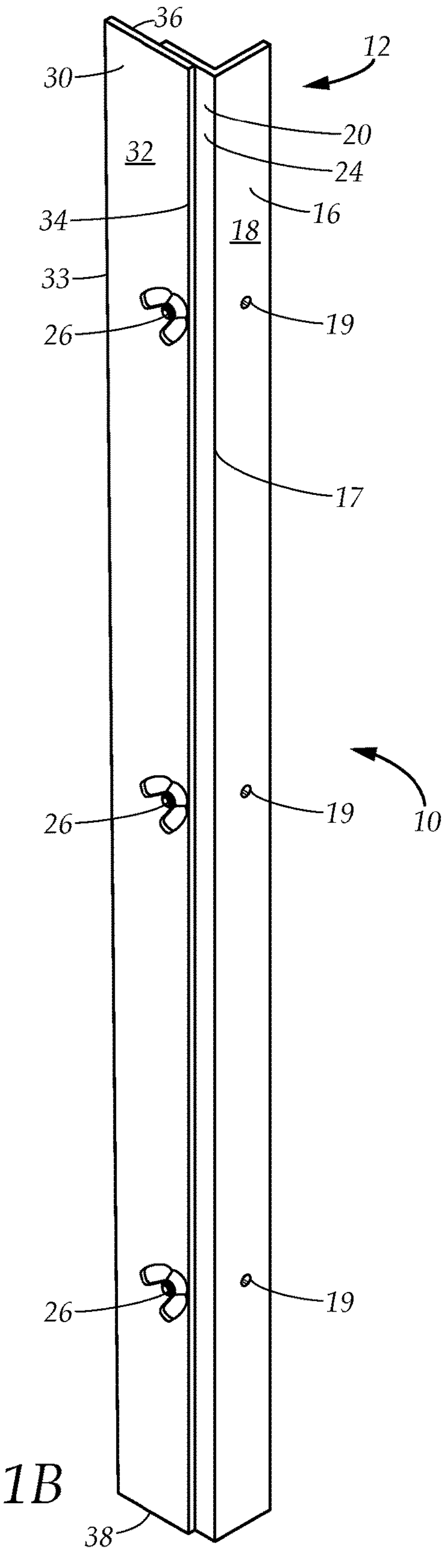
FIG. 1B is a diagrammatical perspective view showing the adjustable barrier from the opposite direction, in accordance with an embodiment of the present disclosure.
Figure 5A:
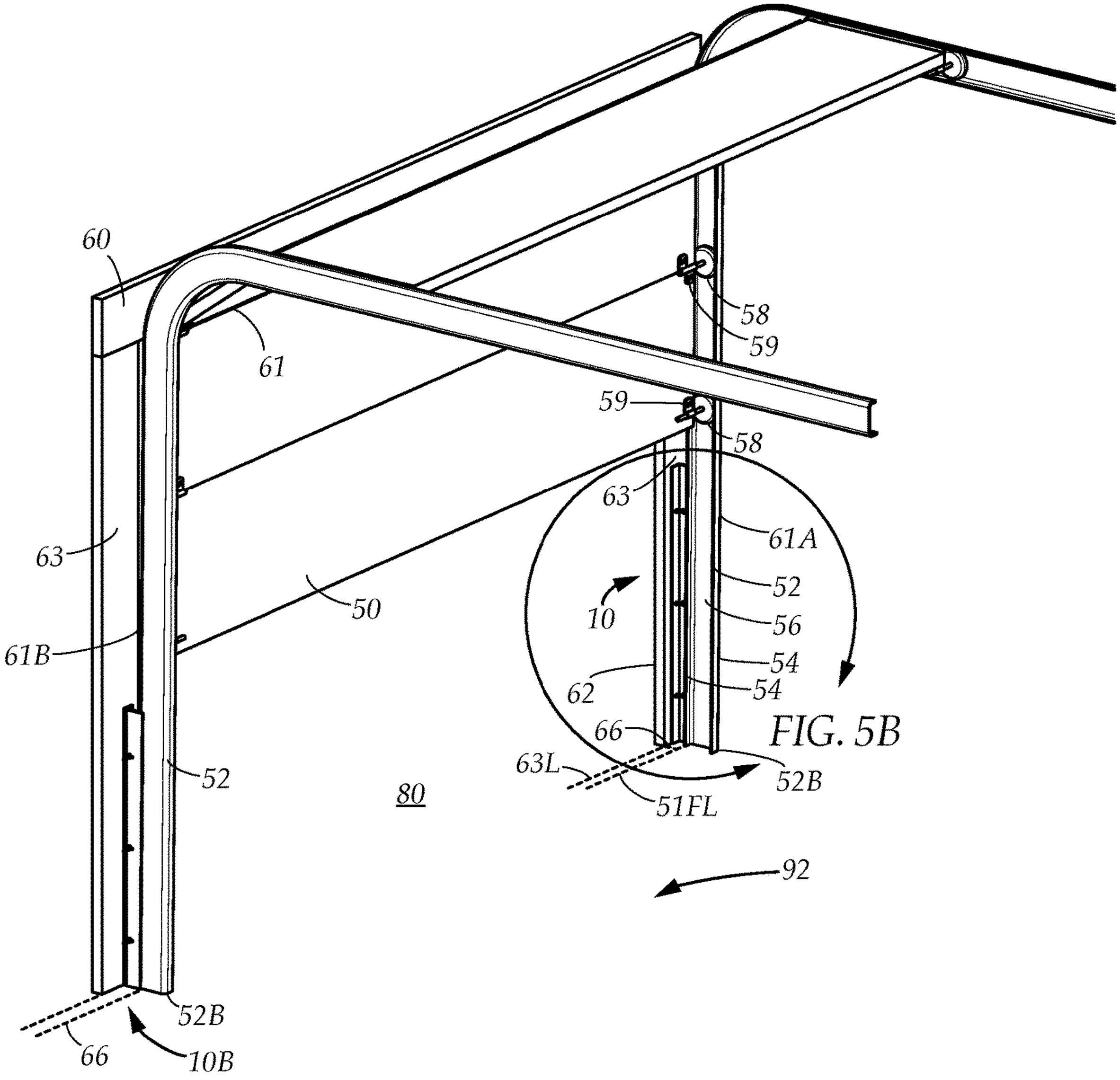
FIG. 5A is a diagrammatical perspective view of a garage door and track assembly operably installed within a garage door frame, showing the adjustable barrier positioned between and sealing off a garage door gap located between the track assembly and the garage door frame, in accordance with an embodiment of the present disclosure.
Figure 8:
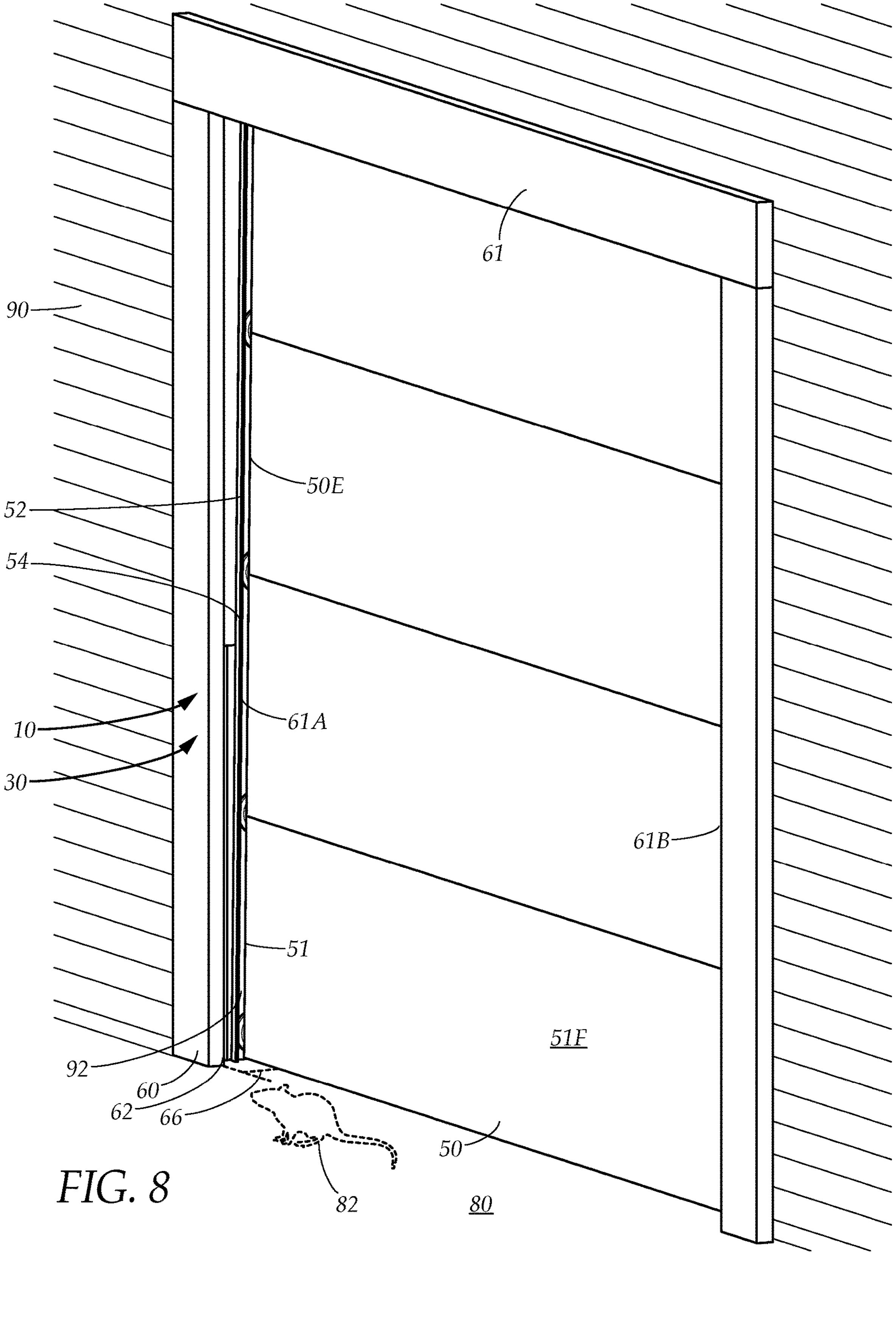
FIG. 8 is a diagrammatical perspective view of the garage door in a closed position as seen from the exterior of a building, where a pest is prevented from accessing the interior of the building via the garage door gap by the presence of the adjustable barrier, in accordance with an embodiment of the present disclosure.

FIGS. 1A-B illustrate an adjustable barrier 10 comprising a barrier bracket 12 and an extendable barrier panel 30. Referring also to FIG. 5A and FIG. 8, an example building 90 has an interior space 92, a garage door 50, a garage door frame 60, and a garage door opening 62 within the garage door frame 60. The building 90 further rests upon a ground surface 80. The garage door frame 60 has a door frame top 61 and door frame sides corresponding to a first door frame side 61A and a second door frame side 61B. The door frame opening 62 is defined by the ground surface 80, the door frame top 61, and the first and second door frame sides 61A, 61B. The door frame 60 may have a garage door gap 66 caused by imperfect contact between the garage door 50 and the door frame 60 when the garage door 50 is closed, which allows a pest 82, such as a rat or mouse, to enter the building 90. The adjustable barrier 10 prevents the pest 82 from entering the building 90 by physically blocking the garage door gap 66. Returning to FIGS. 1A-B, the barrier bracket 12 has an upper edge 13, a bottom edge 14, and an anchoring panel 16 and a barrier panel 20 which extend between the upper edge 13 and the bottom edge 14. The anchoring panel 16 and the barrier panel 20 are joined together along a bend line 17 which extends perpendicularly between the upper edge 13 and the bottom edge 14 so that the barrier panel 20 is positioned perpendicularly to the anchoring panel 16. The anchoring panel 16 further has an anchoring panel outer face 18, an anchoring panel inner face 18B disposed opposite to the anchoring panel outer face 18, and an anchoring panel edge 15A which extends between the upper and bottom edges 13, 14 and is positioned opposite the bend line 17. The barrier panel 20 further has a barrier panel inner face 22, a barrier panel outer face 24 disposed opposite the barrier panel inner face 22, and a barrier panel edge 15B which extends between the upper and bottom edges 13, 14 and is positioned opposite the bend line 17.

The extendable barrier panel 30 has a top edge 36, a lower edge 38, and a first edge 33 and second edge 34 which extend between the top and lower edges 36, 38. The extendable barrier panel 30 further has an extendable barrier panel inner face 31, and an extendable barrier panel outer face 32 disposed opposite the extendable barrier panel inner face 31. The extendable barrier panel 30 is positioned in contact with the barrier bracket 12 such that the extendable barrier panel inner face 31 is parallel to and in contact with the barrier panel outer face 24, and the first edge 33 extends away from the anchoring panel 16. The lower edge 38 of the extendable barrier panel 30 is aligned with the bottom edge 14 of the barrier bracket 12. The top edge 36 of the extendable barrier panel 30 may be aligned with the upper edge 13 of the barrier bracket 12, or may alternatively extend beyond or terminate below the upper edge 13.

In a preferred embodiment, the barrier bracket 12 and the extendable barrier panel 30 are made of a durable material such as metal or plastic which is capable of withstanding exposure to moisture, cold and heat, while resisting damage caused by pests. The barrier bracket 12 may be formed from a single piece of metal which is bent along the bend line 17 to form the anchoring panel 16 and the barrier panel 20. Alternatively, the anchoring panel 16 and the barrier panel 20 may be formed from separate components.

Figure 2:
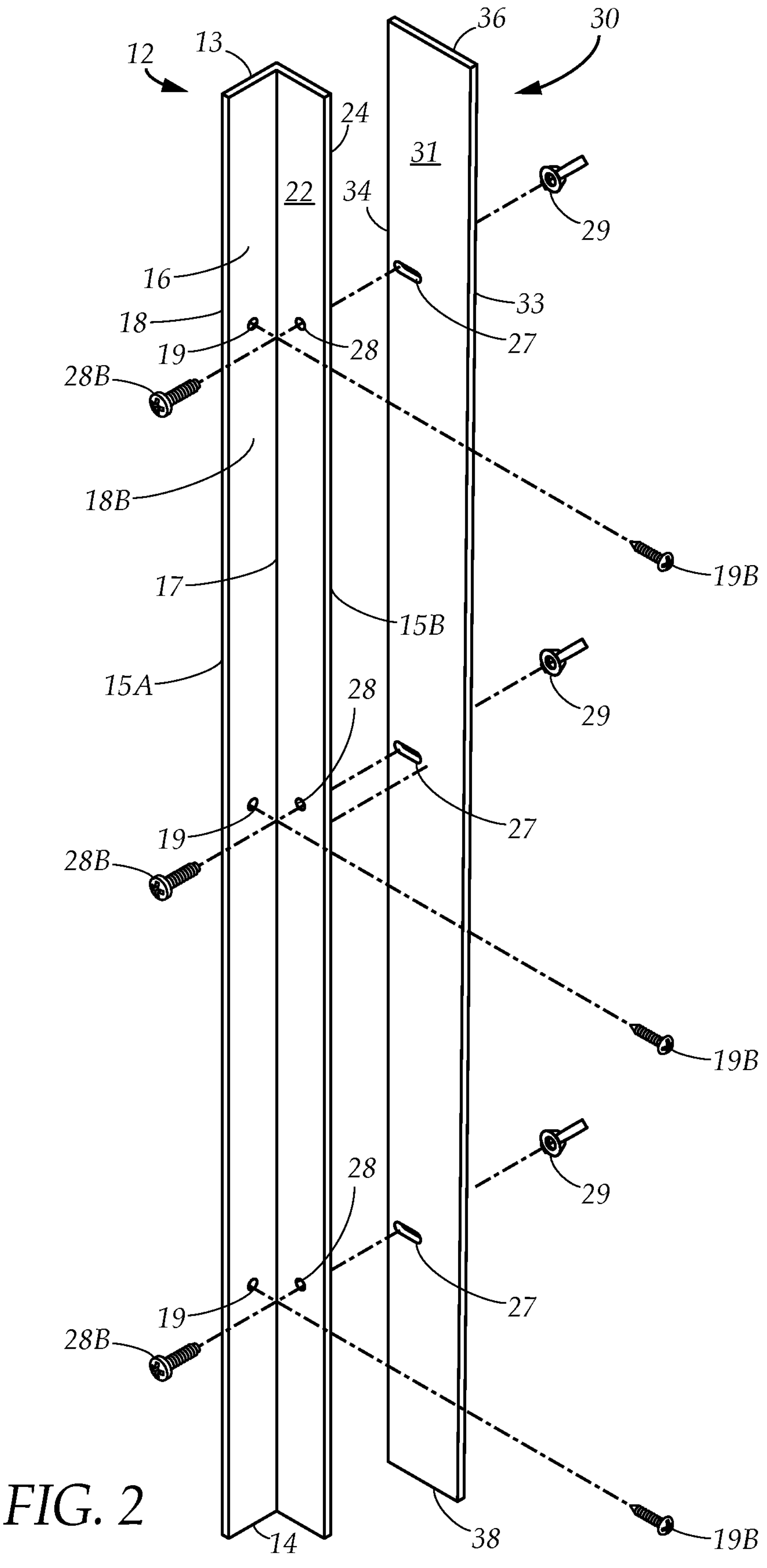
FIG. 2 is a diagrammatical exploded view showing an extension adjustment mechanism which allows the extendable barrier panel to extend in relation to the barrier bracket, in accordance with an embodiment of the present disclosure.

Turning now to FIG. 2 while continuing to refer to FIGS. 1A-B, the extendable barrier panel 30 is removably attached to the barrier panel 20 via one or more extension adjustment mechanisms 26. In a preferred embodiment, each extension adjustment mechanism 26 comprises an extension adjustment hole 28 formed on the barrier panel 20, an extension adjustment channel formed on the extendable barrier panel 30, a bolt 28B which passes through both the extension adjustment hole 28 and the extension adjustment channel 27, and a nut 29. Note that the extension adjustment mechanism 26 may be implemented in other ways as will be apparent to a person of ordinary skill in the art in the field of the invention.

Figure 3A:
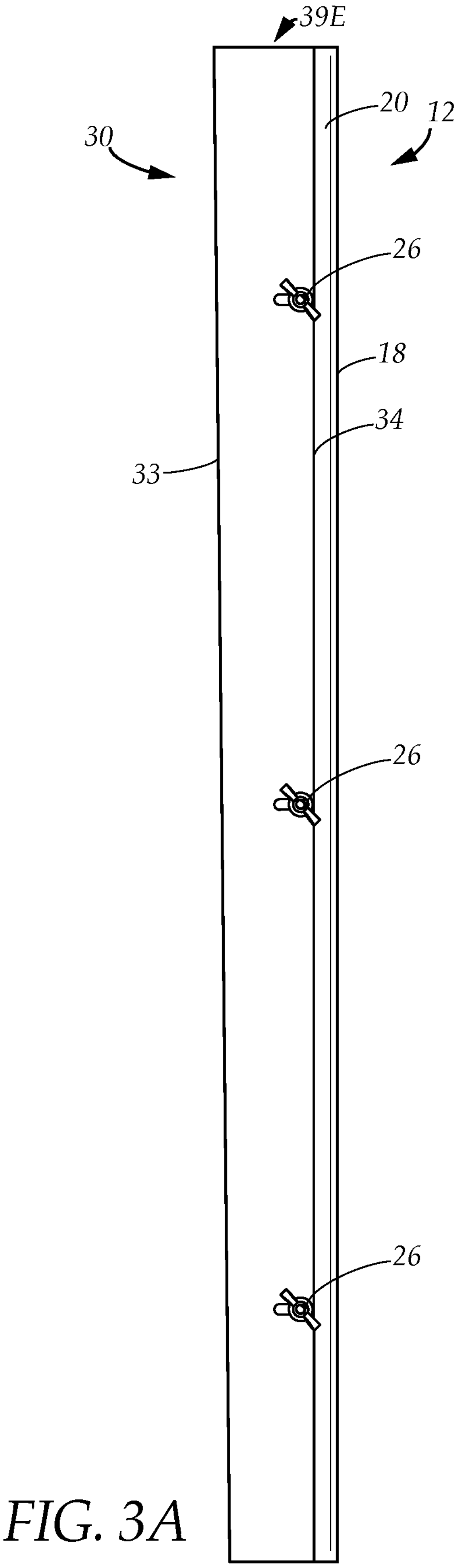
FIG. 3A is a diagrammatical side view of the adjustable barrier showing the extendable barrier panel in an extended position relative to the barrier bracket, in accordance with an embodiment of the present disclosure.
Figure 3B:
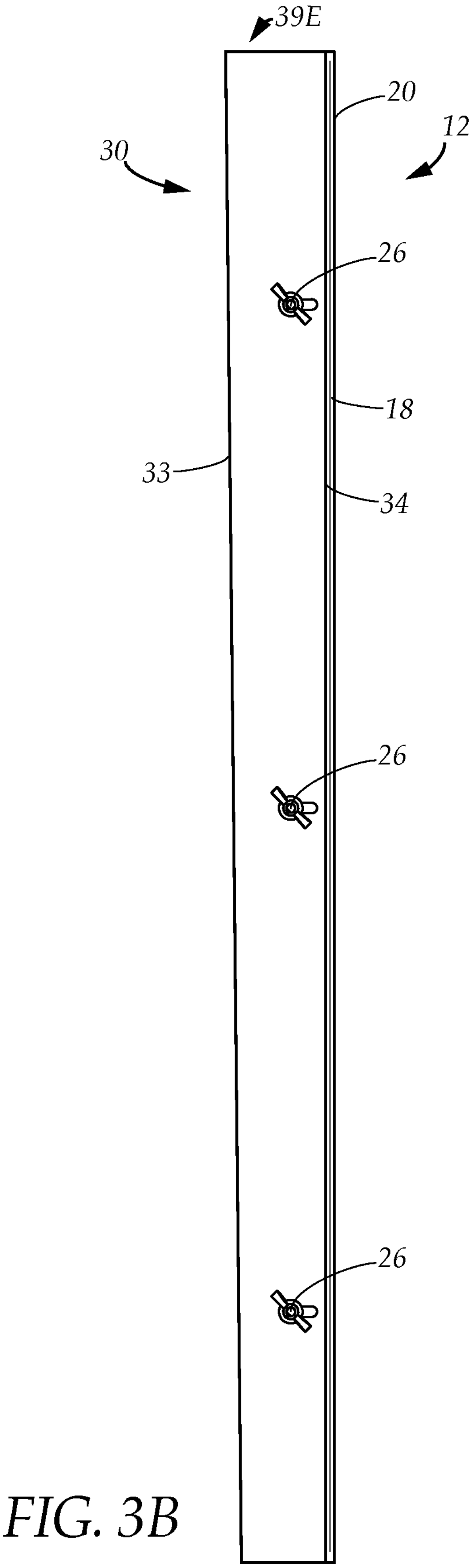
FIG. 3B is a diagrammatical side view of the adjustable barrier showing the extendable barrier panel in a retracted position relative to the barrier bracket, in accordance with an embodiment of the present disclosure.

Turning now to FIGS. 3A-B while continuing to refer to FIG. 2, the extendable barrier panel 30 is adapted to extend and retract between an extended position 39E whereby the second edge 34 of the extendable barrier panel 30 is distally oriented relative to the anchoring panel 16, and a retracted position whereby the second edge 34 is positioned proximate to the anchoring panel 16. The extension adjustment channel 27 may be elongated to allow the extended barrier panel 30 to slide around the bolt 28B thereby facilitating the movement of the extendable barrier panel between the extended and retracted positions 39E, 39R. The nut 29 of each extension adjustment mechanism 26 may be loosened to allow the extendable barrier panel 30 to extend or retract, and may be tightened to fix the extendable barrier panel 30 in place against the barrier panel 20. Note that in an alternate embodiment, the extendable barrier panel 30 is not configured to extend and retract, and may instead be fixed in a single position in which the first edge 33 extends beyond the barrier panel edge 15B. The width of the extendable barrier panel 30 may be varied to adapt to garage door gaps of varying sizes.

Figure 4:
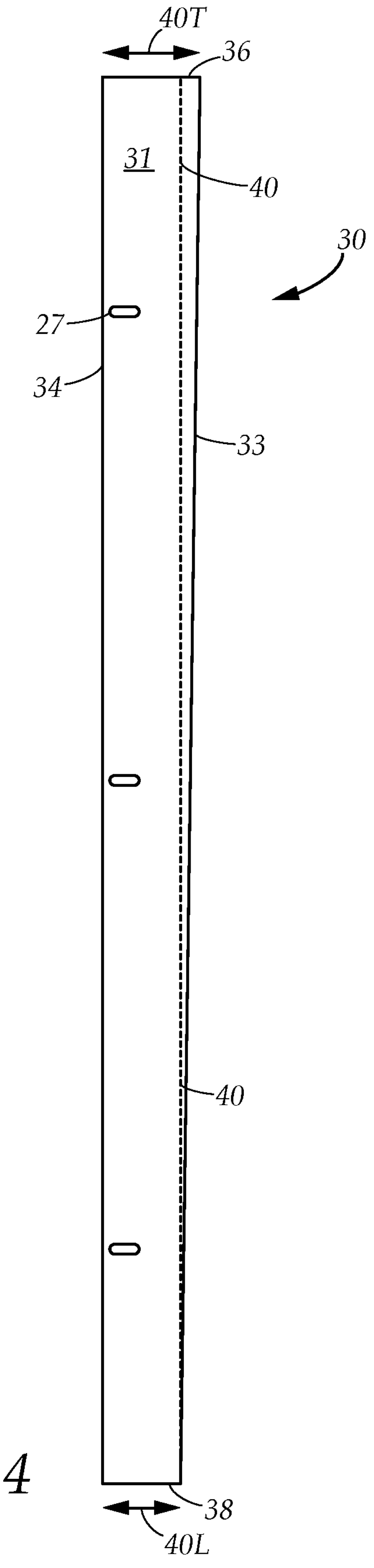
FIG. 4 is a diagrammatical side view of the extendable barrier panel in a tapered configuration, in accordance with an embodiment of the present disclosure.

Continuing now to FIG. 4, the extendable barrier panel 30 may have a tapered configuration. The top edge 36 of the extendable barrier panel 30 may have a top edge length 40T which is greater than a lower edge length 40L of the lower edge 38, causing the width of the extendable barrier panel 30 to progressively taper 40 from the top edge 36 towards the lower edge 38. The first edge 33 is therefore angled away from the second edge 34 as it extends between the top and lower edges of the extendable barrier panel 30. In an alternate embodiment, the top edge length 40T and the lower edge length 40L may be the same, such that the width of the extendable barrier panel 30 does not taper.

Figure 5B:
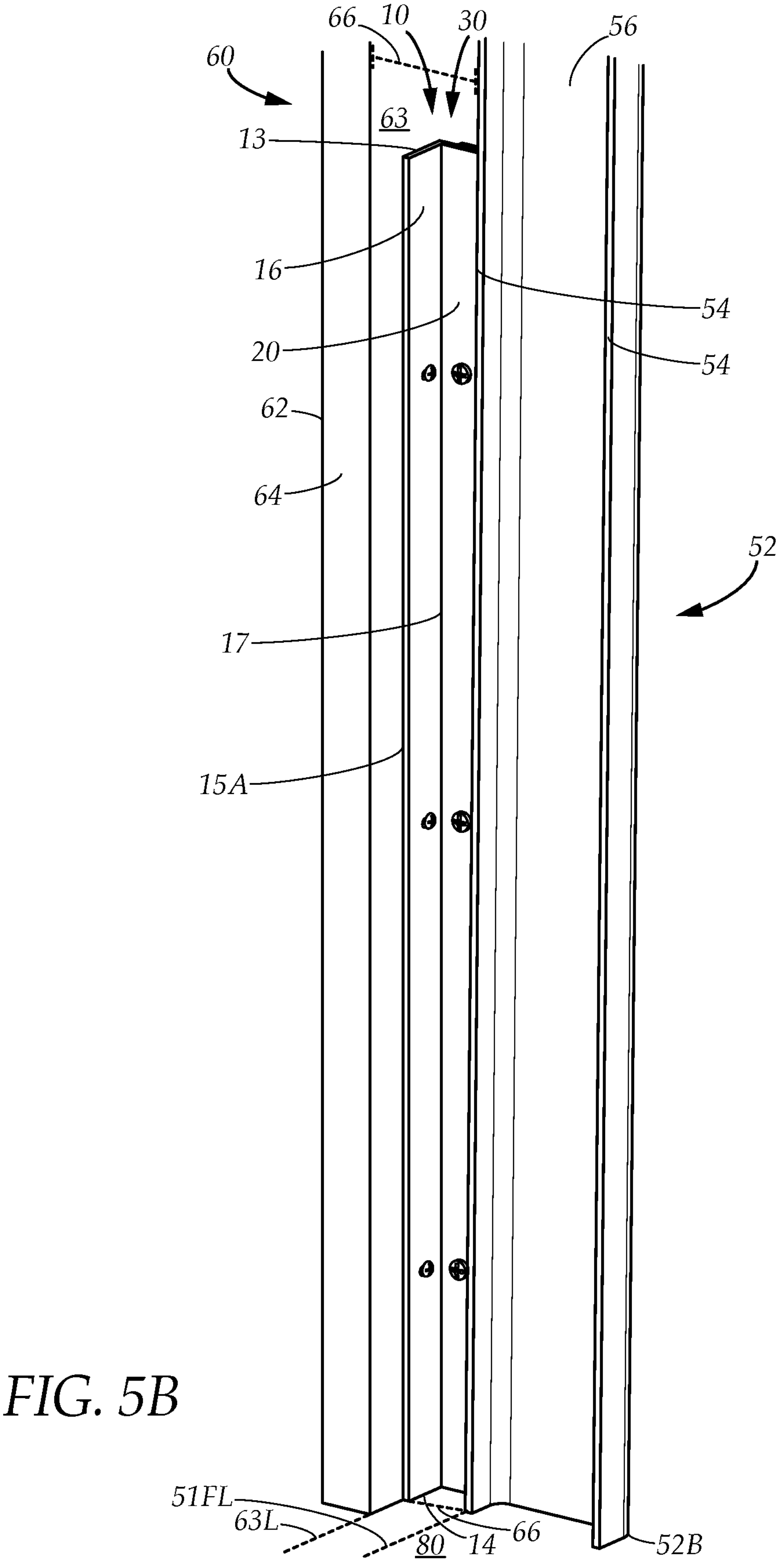
FIG. 5B is a diagrammatical perspective enlarged view of the adjustable barrier as shown in FIG. 5A, depicting the anchoring panel of the barrier bracket anchored to the garage frame inner wall with the barrier panel extending towards the track, in accordance with an embodiment of the present disclosure.

Turning now to FIGS. 5A-B, the garage door 50 is adapted to be raised and lowered within the door frame opening 62 via a parallel pair of tracks 52, with one of the pair of tracks 52 being positioned to the right and left of the door frame opening 62, proximate to either the first door frame side 61A or the second door frame side 61B. Each track 52 is vertically oriented and has a track plate 56 and a parallel pair of rails 54 which project from the track plate 56 towards the other track 52. Each track 52 has a track base 52B which rests upon the ground 80, and the track plate 56 and rails 54 extend upwardly away from the track base 52B. The garage door 50 has a plurality of rollers 58 connected to hinges 59, and each roller 58 is adapted to fit between the rails 54 and travel upwardly or downwardly along the track between the rails 54. The garage door 50 is positioned between the pair of tracks 52, allowing the garage door 50 to be alternately raised and lowered as the rollers 58 travel along the track 52.

Referring to FIG. 5A-B and FIGS. 7-8 simultaneously, the door frame 60 has an inner wall 63, and the pair of tracks 52 are positioned proximate to the inner wall 63 on either side of the garage door opening 62. The pair of tracks 52, positioned on either side of the garage door 50, are separate from and do not contact the door frame inner wall 63. The imperfect contact between the side edge 51 of the garage door 50 and the garage door frame 60 allows a pest 82 to bypass the garage door 50 and enter the building 90 through the garage door gap 66 created by the space separating the garage door 50 and one of the tracks 52 from the door frame inner wall 63. For example, the garage door gap 66 may specifically correspond to the space between a plane 51FL defined by the garage door front face 51F, and a plane 63L defined by the door frame inner wall 63. Note that the positioning of the adjustable barrier 10 between the door frame inner wall 63 and the track 52 prevents the adjustable barrier from being affected by warping or buckling of the garage door 50. The adjustable barrier 10, being secured to the door frame itself and the track 52, will continue to seal off the garage door gap 66 even if the garage door 50 were to shift inwardly in a way that would ruin the effectiveness of conventional weather stripping or similar means.

Referring to FIGS. 5A-B and FIG. 7-8 while also referring to FIG. 1B, the adjustable barrier 10 is positioned between the track 52 and the door frame inner wall 63 such that the anchoring panel outer face 18 of the anchoring panel 16 contacts the door frame inner wall 63 and the bottom edge 14 of the adjustable barrier 10 contacts the ground 80. In a preferred embodiment, the anchoring panel edge 15A is oriented towards the garage door opening 62, and the extendable barrier panel inner face 31 contacts the track plate 56 of the track 52 on the side of the track plate 56 opposite the rails 54. The barrier panel 20 and the extendable barrier panel 30 span the garage door gap 66, physically preventing passage through the garage door gap 66 by the pest 82. The height of the barrier bracket 12, as measured from the bottom edge 14 to the upper edge 13 may be increased to allow the adjustable barrier 10 to extend anywhere from the ground 80 to the door frame top 61 to potentially match the height of the garage door. The height of the extendable barrier panel 30, as measured from the lower edge 38 to the top edge 36, may be similarly increased.

Returning to FIGS. 3A-B while also referring to FIGS. 5A-B, the tracks 52 may be installed at different distances from the door frame inner wall 63. As a result, the length of the garage door gap 66, as measured from the door frame inner wall 63 to the track 52, will vary. Therefore, the adjustable barrier 10 is capable of extending and retracting between the extended and retracted positions 39E, 39R allowing the adjustable barrier to seal the garage door gap 66 by extending the extendable barrier panel 30 to account for varying distances between the track 52 and the door frame inner wall 63.

Figure 6:
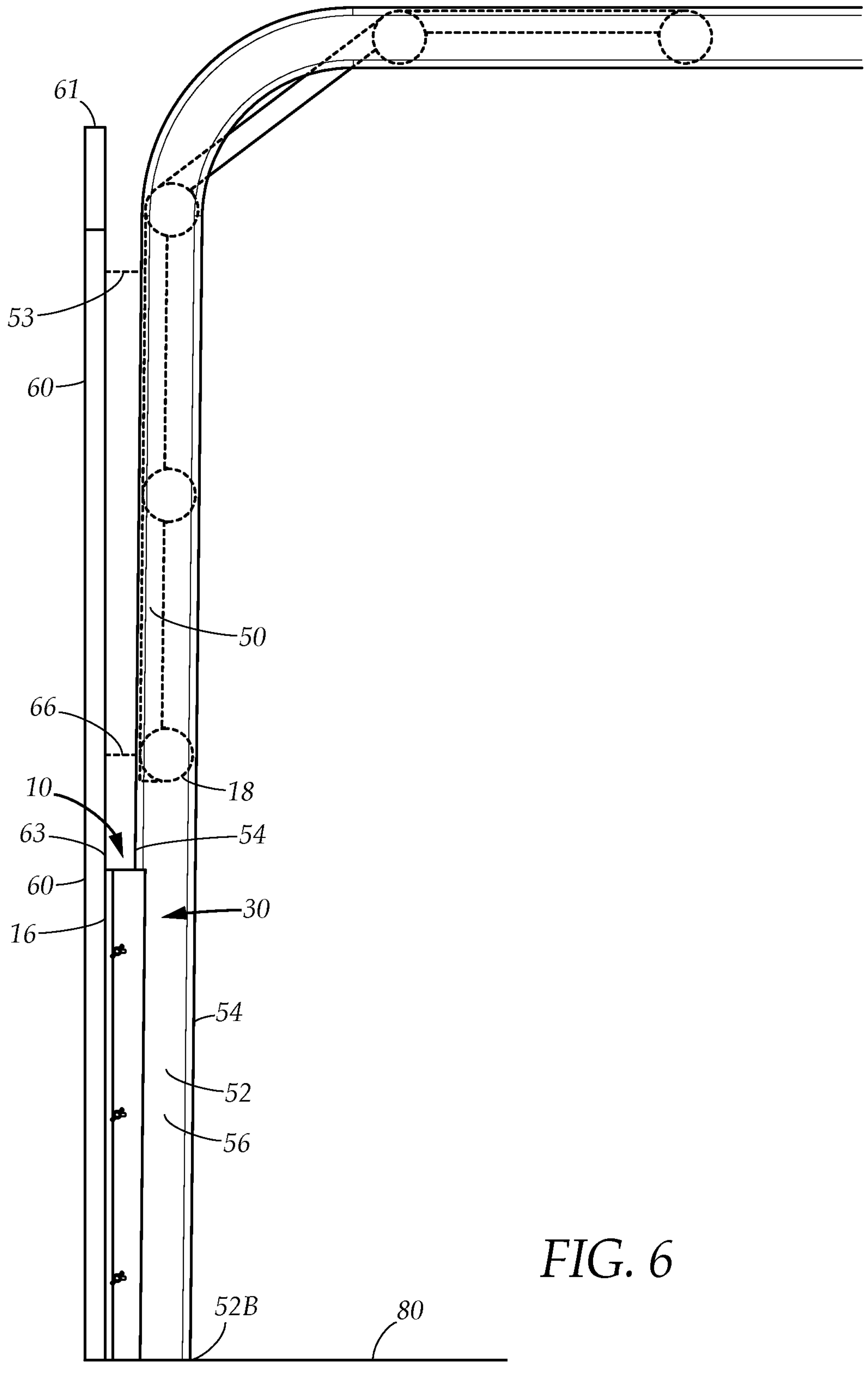
FIG. 6 is a diagrammatical side view of the garage door and track assembly and the adjustable barrier, showing the extendable barrier panel in the extended position where it projects from the adjustable barrier to contact the track, in accordance with an embodiment of the present disclosure.
Figure 7:
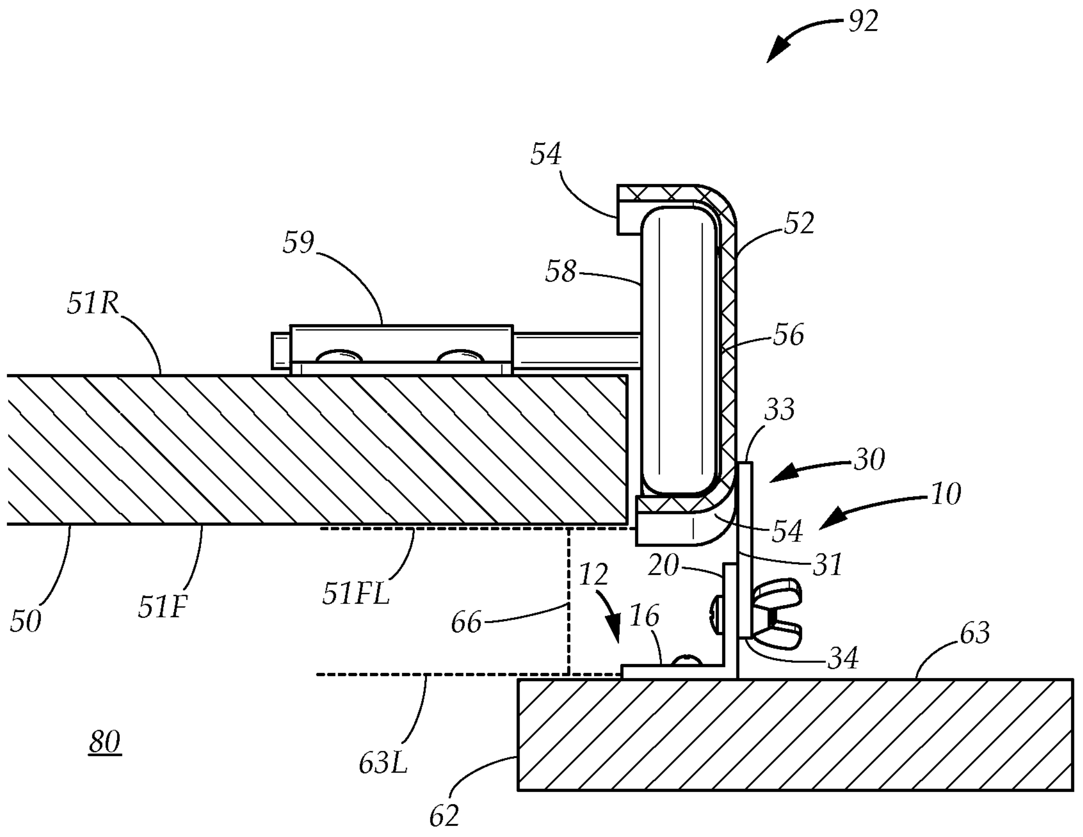
FIG. 7 is a top down sectional view of the garage door and track assembly and the adjustable barrier, showing the adjustable barrier positioned in contact with the garage door frame inner wall and the track to seal off the garage door gap, in accordance with an embodiment of the present disclosure.

Turning now to FIG. 6 while continuing to refer to FIG. 4, FIGS. 5A-5B, and FIG. 7, the track 52 may extend slightly away from the door frame inner wall 63, such that the distance 53 between the door frame inner wall 63 and the track 52 increases as the track 52 extends upward from the ground 80. The tapered configuration of the extendable barrier panel 30 allows the extendable barrier panel to conform to the progressively increasing distance between the track and the door frame inner wall 63, and ensures that the extended barrier panel inner face 31 is able to contact the track plate 56 at any point between the ground 80 and the door frame top 61.

Returning to FIGS. 1A-B and FIG. 5A, the adjustable barrier 10 is capable of being reversed, so that the upper edge 13 of the barrier bracket 12 and the top edge 36 of the extended barrier panel 30 are oriented downwardly in contact with the ground 80, while the bottom edge 14 of the barrier bracket 12 and the lower edge 38 of the extendable barrier panel are oriented upwardly towards the door frame top 61. The adjustable barrier 10 may therefore be positioned to the right or the left of the door frame opening 62. For example, a second adjustable barrier 10B is shown in FIG. 5A, positioned on the side of the door frame opening 62 opposite the adjustable barrier 10. Referring to FIG. 4 while continuing to refer to FIG. 5A, where the extendable barrier panel 30 is in the tapered configuration, the extendable barrier panel 30 is not reversed, and is instead attached to the reversed second adjustable barrier 10B such that the top edge 36 of the extendable barrier panel 30 remains oriented upwardly towards the door frame top 61.

Note that the adjustable barrier may be modified to be used with other kinds of doors which are raised and lowered using a track assembly, and the principles contained herein are not exclusively applicable to garage doors. The adjustable barrier may be adapted to seal off any door gap formed as a result of imperfect contact between a door and its door frame, in accordance with the principles of the present disclosure. For example, the adjustable barrier may be adapted for use with the door of a loading dock, or roll-down shutters.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented an adjustable garage door pest barrier. The disclosure is illustrated by example in the drawing figures, and throughout the written description. It should be understood that numerous variations are possible, while adhering to the inventive concept. Such variations are contemplated as being a part of the present disclosure.

What is claimed is:

1. A method for preventing a pest from entering a building having an interior space and a door frame standing upon a ground surface, the door frame having a door frame top and door frame sides comprising a first door frame side and a second door frame side, the door frame top, the first and second door frame sides, and the ground surface define a door frame opening, the door frame further having a door frame inner wall facing the interior space, the building further having a garage door and a pair of tracks, the pair of tracks are each positioned opposite to each other proximate to either door frame side within the building interior, and each track extends upwardly from the ground surface and has a track plate and a pair of rails which project from the track plate towards the other track, the garage door has a garage door front face and a garage door inner face disposed towards the interior space, and is movably attached between the pair of tracks and selectively covers the door frame opening, the garage door is positioned within the interior space such that a door gap is created between the garage door front face and a plane defined by the door frame inner wall, whereby the door gap allows the pest to bypass the garage door and enter the interior space, comprising the steps of:

providing an adjustable barrier comprising a barrier bracket having an upper edge, a lower edge, an anchoring panel, and a barrier panel, the anchoring panel and the barrier panel extend between the upper edge and the lower edge, and the barrier panel is positioned perpendicularly to the anchoring panel, the adjustable barrier further comprising an extendable barrier panel attached to the barrier panel which projects away from the anchoring panel;

positioning the adjustable barrier between the track and the door frame inner wall proximate to the first door frame side such that the bottom edge contacts the ground surface, the anchoring panel contacts the door frame inner wall, and the barrier panel projects away from the anchoring panel towards the track; and sealing the garage door gap proximate to the first door frame side by positioning the extendable barrier panel in contact with the track so that the adjustable barrier spans the garage door gap from the door frame inner wall to the track, and preventing the pest from entering the building via the garage door gap proximate to the first door frame side.

2. The method as described in claim 1, wherein:

the extendable barrier panel is adapted to selectively extend and retract relative to the barrier panel between a retracted position and an extended position, whereby the extendable barrier panel is proximately positioned relative to the anchoring panel when in the retracted position and is distally positioned relative to the anchoring panel when in the extended position; and the step of positioning the adjustable barrier between the track and the door frame is followed by the step of:

extending the extendable barrier panel towards the extended position so that the extendable barrier panel contacts the track plate of the track.

3. The method as described in claim 2, wherein:

the step of providing an adjustable barrier is followed by the step of:

providing a second adjustable barrier;

the step of sealing the garage door gap proximate to the first door frame side is followed by the steps of:

positioning the second adjustable barrier in a reversed configuration between the track and the door frame inner wall proximate to the second door frame side, such that the top edge of the second adjustable barrier contacts the ground surface, the anchoring panel of the second adjustable barrier contacts the door frame inner wall, and the barrier panel of the second adjustable barrier projects away from the anchoring panel towards the track proximate to the second door frame side;

extending the extendable barrier panel of the second adjustable barrier towards the extended position so that the extendable barrier panel of the second adjustable barrier contacts the track plate of the track proximate to the second door frame side; and sealing the garage door gap proximate to the second door frame side by positioning the extendable barrier panel of the second adjustable barrier in contact with the track proximate to the second door frame side, so that the second adjustable barrier spans the garage door gap from the door frame inner wall to the track, and preventing the pest from entering the building via the garage door gap proximate to the second door frame side.

* * * * *